Jan. 7, 1964   KAZUO TANUMA   3,116,770
HARD-BOILED EGG CUTTING TOOL
Filed April 13, 1961   2 Sheets-Sheet 1
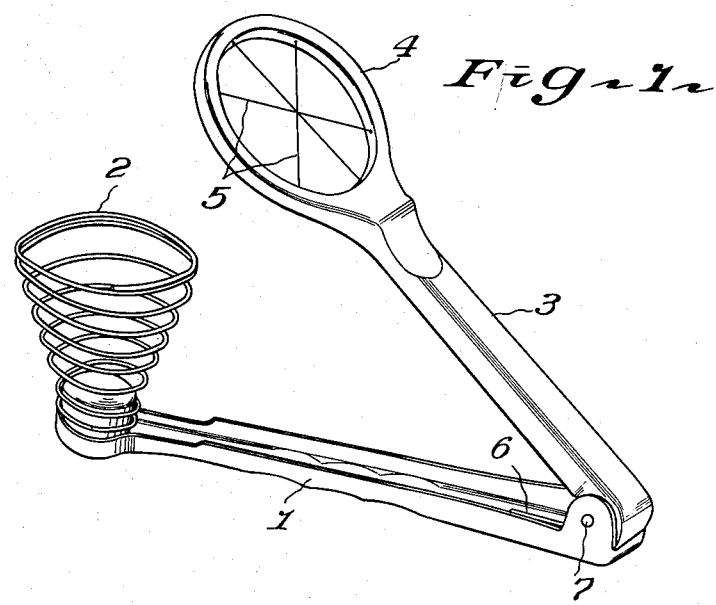
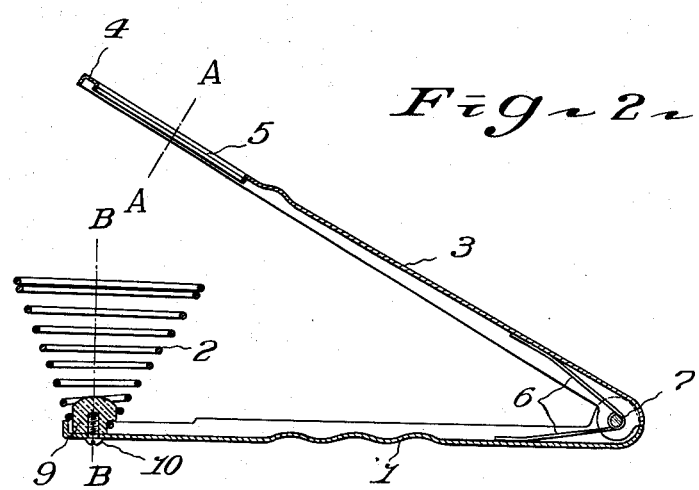

United States Patent Office 3,116,770
Patented Jan. 7, 1964

3,116,770
HARD-BOILED EGG CUTTING TOOL
Kazuo Tanuma, 236–9 Takano-machi, Adachi-ku,
Tokyo-to, Japan
Filed Apr. 13, 1961, Ser. No. 102,764
2 Claims. (Cl. 146—2)

This invention relates to kitchen utensils of the cutting type, and more particularly relates to a new and improved tool for cutting a shelled hard-boiled egg into substantially equal portions.

In the culinary arts of almost all regions of the world, there are occasions wherein it is desired to cut and divide shelled hard-boiled eggs into substantially equal portions with the cutting planes passing substantially through the longitudinal axis of the eggs. Heretofore, such cutting has been accomplished mostly by means of ordinary kitchen knives, but this method has required considerable manual dexterity because of the resilient, unstable physical nature of boiled eggs and their tendency, particularly that of their yolks, to disintegrate readily. Special boiled-egg cutting tools have been invented, but these, in most cases, require the use of both hands of the operator and are inconvenient during the cutting operation and in their cleaning after use.

It is an essential object, therefore, of the present invention to provide a new and improved tool for cutting shelled hard-boiled eggs into substantially equal portions, which can be operated principally by one hand in a simple, efficient manner, is of simple, sanitary, yet durable, trouble-free construction, and can be easily and conveniently cleaned after use.

The foregoing object as well as other objects and advantages have been achieved by the egg cutting tool of the present invention, the details of which will be clearly apparent from a consideration of the following detailed description of a preferred embodiment thereof, when taken in connection with the accompanying drawing in which the same parts are designated by the same reference numerals, and in which:

FIG. 1 is a perspective view of the preferred embodiment;

FIG. 2 is an elevational side view partly in cross section of the embodiment in FIG. 1;

Figure 3:
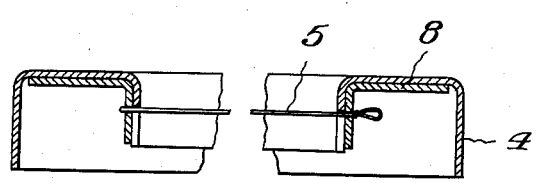
FIG. 3 is an enlarged sectional view taken along the line AA of FIG. 2.
Figure 4:
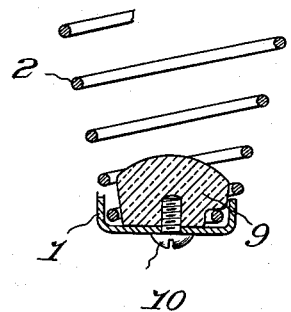
FIG. 4 is an enlarged sectional view taken along the line BB of FIG. 2.

Referring to the drawing, the principal parts of the embodiment of the invention are a holder 2 for holding a shelled boiled egg and a cutter 5 for cutting the egg held by the holder 2. The holder 2 and the cutter 5 are supported and guided in operation by a hinged structure resembling a pair of forceps, which comprises a holder arm 1, on the working end of which the bottom portion of the holder 2 is fixed, and a cutter arm 3, the working end of which is formed into a cutter head 4 of circular ring shape adapted to hold an interchangeable cutter frame 8 on which the cutter 5 is supported. The ends of the holder arm 1 and the cutter arm 3 opposite their working ends are hinged by means of a hinge pin 7 in such a manner that during the egg cutting operation, the center of the cutting head 4 is retained substantially in alignment with the center of the holder 2 and, accordingly with the center of the egg held by the holder 2.

A spring 6 is provided near the pin 7 to exert a return force on the arms 1 and 3 and to place said arms 1 and 3 in a normally-open state.

The holder 2 in the embodiment shown is of spiral coil construction, substantially of conical configuration in the free state. Its dimensions are selected to afford positive reception and retention of an egg of ordinary size. The conical configuration advantageously affords self-alignment of the egg placed therein and self-adaption to allow for some differences in the size of the egg. The spiral coil 2 is formed from wire of suitable gauge made of some corrosion-resistant metal such as stainless steel and is heat-treated for sufficient elastic property as a spring. The spiral coil 2 is held rigidly at its base to the holder arm 1 by a base block 9, which is fastened to the arm 1 by a screw 10. The base block 9 has an additional function similar to that of a chopping block in that it serves to provide a reaction against the cutting force of the cutter 5, particularly toward the end of the cutting stroke, and assists the cutter 5 to achieve a clean final cut. For this purpose, it has been found advantageous to provide the base block 9 with a partial spherical surface on its top or working part. For light weight, this block 9 is preferably made of a synthetic resin.

The cutter 5 in the embodiment shown consists of lengths of wire stretched tautly across the cutter frame 8. This wire is of a suitable gauge and is made of drawn metal of corrosion-resistant property such as stainless steel. The number and disposition of the pieces of wire are selected to make the desired cut. A plurality of interchangeable cutter frames 8, each with a different number and disposition of the pieces of wire, is provided. The cutter frame 8 is held to the cutter head 4 by the substantially tight fit therebetween, and disconnection for interchanging the cutter frame 8 is readily accomplished by prying with such an object as a table knife.

The arms 1 and 3 are preferably made of a corrosion-resistant material such as stainless steel, aluminum, plated metal, or a synthetic resin. In the embodiment shown, they are formed by press work from sheet metal, and suitable flanges are provided for mechanical strength and rigidity.

The other parts such as the spring 6 and the hinge pin 7 are also made of a corrosion-resistant metal, preferably the same metal as that of the arms 1 and 3 if these are made of metal.

The cutting tool of the present invention is operated in the following manner. A shelled hard-boiled egg is placed in the holder 2, the conical configuration of which assists in aligning the egg in an upright orientation. The arms 1 and 3 are grasped by one hand and squeezed together, causing the cutter 5 to press against the egg and cut thereinto. As the cutting operation progresses, the cutter head 4 contacts and presses against the extreme outer end of the holder 2 and compresses the holder 2 until the cutting operation has been completed by the cutter 5 contacting the base block 9. During this operation, particularly during the final part thereof, the working end of the tool is preferably held above and close to a receptacle so as to minimize the height of fall of the cut egg portions.

In addition to the advantages of easy operation; low fabrication cost; simple, sanitary, yet durable, trouble-free construction; and easy and convenient cleaning after use, the cutting tool of the present invention has the further advantage of being readily compressible, by causing the cutter head 4 to compress and hold the holder 2, into a compact form requiring small storage space when it is not being used, or when a large shipment lot of the cutting tool is to be transported or stored.

While a particular embodiment of the present invention has been described above, it will, of course, be understood that the invention is not intended to be limited thereto, since many modifications may be made and, therefore, it is contemplated by the appended claims to cover all such modifications as fall within the true spirit and scope of the present invention.

What is claimed is:

1. In a tool for cutting shelled hard-boiled eggs into substantially equal portions of the type having a pair of arms pivotally connected at one end thereof to allow movement of the arms toward and away from each other, spring means for the arms normally biasing the arms away from each other, a holder for an egg secured adjacent the free end of one of the arms, and a cutting means adjacent the free end of the other arm cooperable with the holder when the arms are moved toward each other for cutting the egg in the holder, said holder including a spiral spring coil of conical configuration in an unloaded state, a base block operably coupled to the smaller end of the spiral coil and defining a chopping block, and means securing the base block and spiral coil to the arm so that when the arms are moved towards each other, the cutting means engages the spiral coil and thereafter compresses the spiral coil until the cutting cycle has been completed by the cutting means contacting the base block.

2. The cutting tool as claimed in claim 1, in which said base block is provided with a partial spherical upper surface and said cutting means includes a frame frictionally supported by the arm and a plurality of cutting wires attached to the frame.

References Cited in the file of this patent

UNITED STATES PATENTS

| 1,598,490 | Miller | Aug. 31, 1926 |
| 2,804,111 | Burchett | Aug. 27, 1957 |

FOREIGN PATENTS

| 26,422 | Great Britain | 1904 |
| 8,857 | Great Britain | 1910 |